US011748564B2

(12) United States Patent
Rafferty et al.

(10) Patent No.: US 11,748,564 B2
(45) Date of Patent: Sep. 5, 2023

(54) TEXT-TO-SPEECH ENRICHING SYSTEM

(71) Applicant: Capital One Services, LLC, McLean, VA (US)

(72) Inventors: Galen Rafferty, Mahomet, IL (US); Reza Farivar, Champaign, IL (US); Anh Truong, Champaign, IL (US); Jeremy Goodsitt, Champaign, IL (US); Vincent Pham, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/706,660

(22) Filed: Mar. 29, 2022

(65) Prior Publication Data

US 2022/0238096 A1  Jul. 28, 2022

Related U.S. Application Data

(63) Continuation of application No. 16/910,210, filed on Jun. 24, 2020, now Pat. No. 11,335,327, which is a continuation of application No. 16/669,774, filed on Oct. 31, 2019, now Pat. No. 10,741,168.

(51) Int. Cl.
  *G10L 13/08* (2013.01)
  *G06F 40/279* (2020.01)
  *G10L 13/00* (2006.01)

(52) U.S. Cl.
  CPC ............ *G06F 40/279* (2020.01); *G10L 13/00* (2013.01); *G10L 13/08* (2013.01)

(58) Field of Classification Search
  CPC ......... G10L 13/08; G10L 13/00; G10L 13/02; G10L 13/027; G10L 13/04; G10L 13/047; G10L 13/083
  USPC ..... 704/258, 260, 266, 270, 270.1, 272, 257
  See application file for complete search history.

(56) References Cited

U.S. PATENT DOCUMENTS

| | | |
|---|---|---|
| 5,634,084 A | 5/1997 | Malsheen et al. |
| 8,132,104 B2 | 3/2012 | Ash et al. |
| 9,865,248 B2 | 1/2018 | Fleizach et al. |
| 9,898,542 B2 | 2/2018 | Hayden |
| 9,930,158 B2 | 3/2018 | Basir |
| 10,741,168 B1 | 8/2020 | Rafferty et al. |
| 2007/0011134 A1 | 1/2007 | Langseth et al. |
| 2012/0236201 A1* | 9/2012 | Larsen ................ H04N 21/242 348/468 |

(Continued)

*Primary Examiner* — Qi Han
(74) *Attorney, Agent, or Firm* — Sterne, Kessler, Goldstein & Fox P.L.L.C.

(57) ABSTRACT

Disclosed herein are system, method, and computer program product embodiments for a text-to-speech system. An embodiment operates by receiving text to be converted into audible output and identifying a webpage address within the text. A webpage corresponding to the webpage address is retrieved, wherein the retrieved webpage is not displayed on a user interface. Metadata of the retrieved webpage corresponding to the webpage address is identified. A portion of the metadata is selected to replace the webpage address in an audible version of the text. The webpage address is replaced with the selected portion of metadata of the retrieved webpage corresponding to the webpage address in the audible version of the text. The audible version of the text including the selected portion of metadata is provided for audible output.

20 Claims, 5 Drawing Sheets

(56) References Cited

U.S. PATENT DOCUMENTS

| | | |
|---|---|---|
| 2015/0301721 A1 | 10/2015 | Clark |
| 2017/0124045 A1 | 5/2017 | Canton et al. |
| 2017/0201571 A1* | 7/2017 | Sherf ................ H04L 67/1029 |
| 2017/0308524 A1 | 10/2017 | Bhatt et al. |
| 2018/0203922 A1 | 7/2018 | Erpenbach et al. |
| 2021/0089934 A1 | 3/2021 | Thornley et al. |
| 2021/0134265 A1 | 5/2021 | Rafferty et al. |

* cited by examiner

TEXT-TO-SPEECH ENRICHING SYSTEM

CROSS-REFERENCE TO RELATED APPLICATION

This application is a continuation of U.S. patent application Ser. No. 16/910,210, titled "Text-To-Speech Enriching System" to Rafferty et al., filed on Jun. 24, 2020, which is a continuation of U.S. patent application Ser. No. 16/669,774, titled "Text-To-Speech Enriching System" to Rafferty et al., filed on Oct. 31, 2019, both of which are herein incorporated by reference in their entireties.

BACKGROUND

There are many devices and systems which convert text to speech. Many of these text-to-speech systems simply read the text of a document word-for-word for a user. However, this simple or linear translation of text to speech has limitations. For example, a document may include formatted blocks of text which when read word-for-word will either be confusing for a user or not provide the user an accurate or desirable context of the information in the block. This may cause the user to miss important or valuable information when using a text-to-speech system.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a text-to-speech enriching system.

Figure 1:
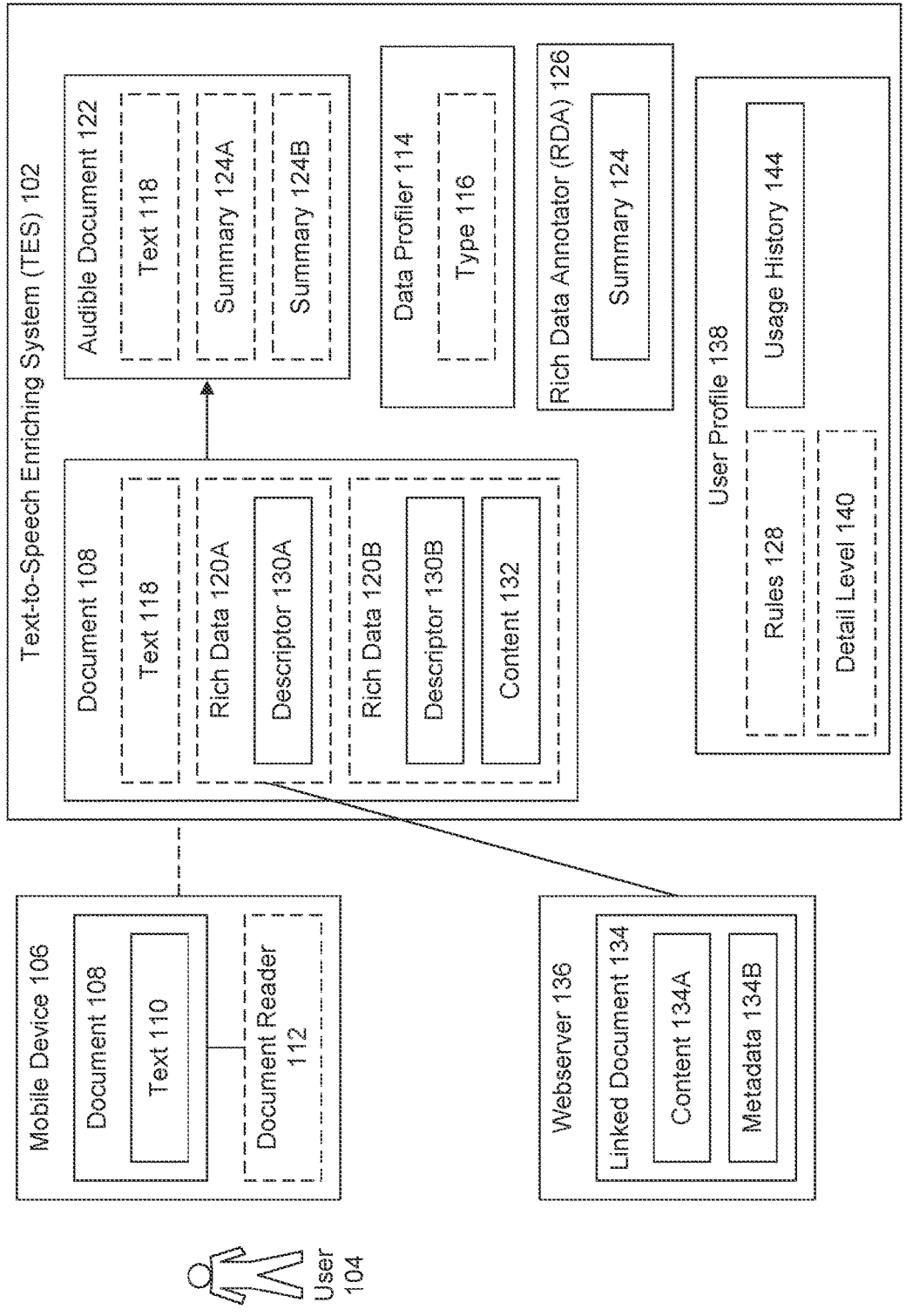
FIG. 1 is a block diagram illustrating an example text-to-speech enriching system (TES) architecture, according to some embodiments.

FIG. 1 is a block diagram 100 illustrating an example text-to-speech enriching system (TES) 102 architecture, according to some embodiments. The purpose of TES 102 is to receive text (e.g., from a document, email, text message, etc.) and convert it into speech or audible format. While some text may be converted into speech exactly as it appears in a document with a simple or linear word-for-word speech conversion, there may be other text in a document that may sound ambiguous or confusing if a linear word-for-word speech conversion process is applied. As such, TES 102 may invoke additional data enrichment processes to provide additional context to the user and prevent any unnecessary confusion or ambiguity that may result from applying a linear word-to-word conversion process.

For example, user 104 may receive a text message (e.g., document 108) that includes the following words: "Ron Santo is my favorite third baseman." When requesting audible version of the text message, a simple word-for-word or linear speech conversion process may yield the exact same phrase "Ron Santo is my favorite third baseman" in an audible format or output.

However, if the text includes a link to a website or other specially formatted or structured text, such as "Ron Santo was my favorite third baseman, check out his career statistics here www.baseballplayersstats.com/ronsantoqbsfkc16.html", then a word-for-word, or letter-for-letter linear speech conversion process may be confusing or unhelpful for a listener and may waste both time and resources. TES 102 is designed to solve this problem.

In an embodiment, TES 102 may add additional text or context to the text message prior to providing it to a speaker or document reader 112 as audible output. For example, rather than simply outputting each letter or word of the website address from the text message in the example above, TES 102 may import additional information from the actual webpage corresponding to the address. In an embodiment, the webpage address from the text message may be replaced with a main title of the webpage, which may be determined from content and/or metadata of the webpage.

For example, if the title of the webpage from the text message is "8 Reasons Why Ron Santo was the best third baseman ever," then the audible version of the text message as output to an audible document 122 may be "Ron Santoa was my favorite third baseman, check out his career statistics here 8 Reasons Why Ron Santo was the best third baseman ever."

In the example of FIG. 1, a user 104 may be operating a mobile device 106, such as a smart phone, television, stereo, laptop, or other standalone audio device such as an audible virtual assistant such as ALEXA, SIRI, CORTANA, or GOOGLE HOME. Using mobile device 106, the user 104 may request that document 108 be read out loud. Example documents 108 may include a text message, chat message, email, webpage, spreadsheet, word processing, video, and image file. The reading out loud may be any audible output to mobile device 106, another speaker, sound system, or audible file.

In an embodiment, mobile device 106 may include or have access to a document reader application (document reader) 112 that reads or converts simple text 110 of document 108 into speech, sounds, or audible output. Simple text 110 (herein referred to as text 110) may be any combination of alphanumeric characters, across one or more languages that may be output using a simple or linear word-for-word speech conversion process.

In an embodiment, document reader 112 may be installed on mobile device 106 as an app or program, or may be accessible to mobile device 106 over a communications network as a web or cloud-based application. Document reader 112 may operate in coordination with TES 102 as described herein. It is understood that a portion of the operations illustrated as being part of the TES 102 may, in other embodiments, be performed locally on mobile device 106 by document reader 112 or another application or program.

In an embodiment, when user 104 requests an audible output of document 108, document reader 112 may determine whether or not TES 102 data enrichment processing is required or would be beneficial for user 104, or whether to perform a linear word-for-word speech conversion process without any additional document enrichment.

For example, a data profiler 114 may scan the text 110 of document 108 to determine whether document enrichment processes of TES 102 should be applied. For example, data profile 114 may scan text 110 to identify any structured or formatted portions or text, referred to herein as rich data 120, within the document 108 or that may be attached to and/or included or embedded in the document 108. As used herein, rich data 120 is used to refer to rich data 120A, rich data 120B, or both rich data 120A and 120B collectively, as illustrated in FIG. 1. In an embodiment, upon or after receiving a 'read document' command from user 104 requesting the audible output of document 108, TES 102 may receive or otherwise be provided access to a copy of document 108 to enable data profiler 114 to identify whether any rich data structure or type 116 information may be identified within document 108.

Structure or type 116 may refer to any known or pre-defined structure, formula, or format for identifying rich data 120 within different types of documents 108. An example of rich data 120 may be an internet protocol (IP) address, which may have or correspond to a structure or type 116 that includes a 32-bit numeric address written as four numbers separated by periods and includes values between 0 to 255.

Another example of rich data 120 may be a webpage address. The type 116 of the webpage address may determine how data profiler 116 identifies that particular text of document 108 is a webpage address. For example, type 116 may identify a particular phrase of document 108 as being a webpage address if it begins with "www" or "http://". Or for example, type 116 may identify webpage addresses as phrases ending with the extension ".html". Other examples of rich data 120 that have corresponding or identifiable types 116 include phone numbers, zip codes, website addresses, tables, property addresses, company names, client names, sports teams, celebrity names, file attachments, images, videos, audio, etc. In an embodiment, data profiler 114 may classify or tag the rich data portions 120 based on their identification amongst types 116.

After receiving an audio output request from a user 104, data profiler 114 may scan the text 110 of document 108 to identify any identifiable types 116 that correspond to pre-identified rich data 120. If no rich data 120 is identified within or attached to document 108, then document reader 112 may perform a simple or linear word-for-word speech conversion and output of the simple text 110 as described above. However, if rich data 120 is associated with (e.g., identified within or attached to) document 108, then TES 102 may perform the data enrichment processes described herein prior to the simple or linear word-for-word speech conversion process.

The data enriching operations performed by TES 102 may include, but are not limited to: adding additional text, removing or replacing, manipulating data, performing calculations, and retrieving and outputting additional information from different websites, files, or other local or network sources. TES 102 may generate or produce an audible document 122, including the enriched data, which may then be provided to document reader 112 for audible output.

In an embodiment, document reader 112 may include data profiler 114 functionality and may perform an initial scan for a format, formula, or structure of text (or attachment) that corresponds to any pre-defined rich data 120 or types 116. If no rich data 120 is identified within document 108, then document reader 112 may audibly output document 108 as is without transmitting document 108 to TES 102 or performing any additional text enrichment operations as described herein.

If however, rich data 120 is identified on mobile device 106 by a data profiler 114 operating either on mobile device 106 or a different TES 102 device, then TES 102 may be notified and receive access to or otherwise retrieve document 108, or at least the rich data sections or portions 120 of document 108 for processing as described herein.

In an embodiment, TES 102 may generate a summary 124 to replace or supplement each rich data portion 120A, 120B identified within document 108. The generated audible document 122 may include a combination of any simple text 118 (e.g., text of document 108 that was not identified as being rich data 120 or corresponding to a type 116) and the generated summaries 124A, 124B. As illustrated, audible document 122 may include a similar order of content relative to the original document 108 with regard to how text 118 and summaries 124 are output. Summaries 124A, 124B may include particular instances of a summary 124, as generated by a rich data annotator (RDA) 126, corresponding to the identified rich data portions 120A, 120B of document 108 and included in audible document 122.

For example, document 108 may be an e-mail that includes the text "You should check out this article www.amazingstories.com/doglearnstospeakxquiv1342.html." The email document 108 may also include a file attachment including a cat image. Based on identifying types 116, data profiler 114 may determine document 108 includes rich data and identify the rich data 120A as being the website address and rich data 120B as being the file attachment.

The webpage address rich data 120A may be identified as a webpage address rich data 120A based on either beginning with "www" or ending with ".html." The file attachment rich data 120B may be identified as rich data 120 because it is an attachment, because it is a file an identifiable file extension corresponding to a type (.jpg or .png), or because it has a pre-identified file name that has been identified as being a rich data type 116.

In processing the email, the text 110 at the beginning of the e-mail "You should check out this article" may be classified as simple text 118 due to the absence of any identifiable types 116 within the text 118. TES 102 may copy or transfer this simple text 118 from document 108 to audible document 122 without any additional processing or data enrichment.

In an embodiment, both rich data 120A and 120B may include descriptors 130A, 130B. Descriptors 130 may include the original, formatted, or structured text from that document 108 that was classified, tagged, or otherwise used to identify a rich data type 116. As used herein, descriptors 130 is used to refer to descriptor 130A descriptor 130B, or both descriptors 130A and 130B collectively, as illustrated in FIG. 1. In the example above, the descriptor 130A of the website address is "www.amazingstories.com/doglearnstospeakxquiv1342.html", while the descriptor 130A of the attachment is file name of the attachment, which may be Cutekittykat.jpg.

TES 102 may perform data enrichment operations to determine which text to include in summaries 124A, 124B for each rich data portions 120A, 120B. The summaries 124A, 124B may then be used to replace the corresponding descriptors 130A, 130B in the audible document 122.

For each portion or section of document 108 tagged or identified as rich data 120A, 120B, a rich data annotator (RDA) 126 may generate a data-enriched summary 124. As described above, summary 124 may include a text that describes or provides additional text relative to, associated with or about the rich data 120 beyond the text of descriptor 130. However, as referenced above, in an embodiment, the summaries 124A, 124B may include descriptors 130A, 130B and additional information as well.

In continuing the example above, the website address from the email ("www.amazingstories.com/doglearnstospeakxquiv1342.html") may be a link or address to a linked document 134 available on another machine or web server 136. For example, linked document 134 may be a website or webpage accessible over the internet from a network or webserver 136. Web server 136 may be any network-enabled machine, including a cloud server or database from which linked document 134 may be retrieved or accessed by TES 102.

The content 134A of linked document 134 may be the text, images, multimedia, and even other links that are part of the webpage 134. The metadata 134B may include an organization of the data of the webpage, and may be accessible from a separate file such as an extensible markup language (XML) file, or may be accessible from the code of the webpage itself. Example metadata 134B for a webpage may identify information or various portions of content 134A that may be used in summaries. For example, metadata 134B may identify the following information about a webpage: main title, subtitle, headings, feature image, feature image description, author, date published, etc.

Based on user preferences (as will be discussed in greater detail below), TES 102 may retrieve or use any content 134A and/or metadata 134B accessible from webserver 136 to generate a summary 124. For example, metadata 134B may indicate that the title of the webpage 134 is "4 year old dog learns to speak English." TES 102 may then copy and paste this title text from linked document 134 as summary 124A in the audible document 122.

In an embodiment, RDA 126 may also include a designation or classification of the type of rich data 116 that was identified in a summary 124. For example, a summary 124 may include designations such as "webpage," "photo", "movie", "spreadsheet", "statistics", "sales numbers", "attachment", or "song."

As such, the original text of document 108 may be "You should check out this article www.amazingstories.com/doglearnstospeakxquiv1342.html," and the corresponding text 118 and summary 124A in audible document 122 may be "You should check out this article webpage 4 year old dog that learns to speak English." In an embodiment, the summary 124A may include additional summaries of any links from linked document 134 which are then processed by TES 102 as being rich data 120.

Content 132 may include details about the actual text or data represented by the descriptor 130. In continuing the example above, the content 132 for the attached image file Cutekittycat.jpg, may be the image of the cat. If the attachment was a word processing document, content 132 may be the alphanumeric text, symbols, and images that are included in the word processing document. TES 102 may analyze the content 132 and return a description or information related to the content 132 for use in summary 124B. For example, TES 102 may provide the image to an image processor that identifies a "cat" in the image. If the attachment was a word processing document, that includes its own metadata, then the metadata of the document may also be used to generate a summary 124B.

In an embodiment, TES 102 may generate a summary 124B for the image attachment that reads: "An attachment Cutekittycat.jpg includes an image of a cat." "An attachment" may describe the type 116 of rich data 120B, and "includes an image of" may be standard text that is used when an image is provided to the image processor for object identification. In an embodiment, TES 102 may generate summary 124 as a JSON (JAVASCRIPT Object Notation) file. A JSON file may use human-readable text to transmit data objects. A JSON file may include attribute-value pairs or array data types.

In an embodiment, RDA 126 generate different summaries 124 for the same document 108 or rich data portion 120 for different users 104 based on differing user preferences as determined based on their user profiles 138. For example, for a different user, for the same attachment, TES 102 may generate the summary 124B that reads: "Cutekittycat.jpg image file" based on a user profile 138.

User profile 138 may include user preferences as to what information should be included in summaries 124 for the particular user 104 requesting audible output. In an embodiment, user profile 138 may include a set of rules 128 specific to a particular user or group of users 104 for generating summary 124 for a particular rich data type 116 in audible document 122.

Rules 128 may indicate how a summary 124 for rich data 120 is generated, and may vary amongst users 104 based on their user profiles 138. Example rules 128 are provided below:

TABLE 1

Examples of Rules For User Profiles

| Rule | UserId | Doc Type | Summary Info |
|---|---|---|---|
| 1 | Dev | Webpage | Main Title |
| 2 | Jen | Webpage | Main Title, Subtitle, Descriptor |
| 3 | Mark | Audio attachment | Artist, Album, Song |

In the example of Table 1, Rule 1 may be for user Dev and indicates that when Rich data 120 is identified as being a webpage (type 116), then the main title text (as identified from metadata) should be included in the corresponding summary. For user Jen, when rich data 120 is a web page, the main title text, subtitle text (if any) and descriptor text (e.g., webpage address) should be included in the summary. With regard to users Dev and Jen, the same document with the same webpage address may result in TES 102 generating two different summaries 124 for the respective audible documents 122 output for the users. For user Mark, when rich data 120 is an audio attachment, the artist name, album name, and song name should be in the summary (if available).

In an embodiment, in lieu of having user specific rules 128, user profile 138 may include a detail level 140 indication. Based on the rules 128 or detail level 140 from user profile information 138, RDA 126 may generate or retrieve different summary 142 for the same rich data 120 for different users 104. Detail level 140 may allow a user to customize, select, or specify how much data or at which level of specificity or detail a user wants included in the generated summary 124 from a predefined set of detail levels.

TABLE 2

Example Detail Levels

| Level | Doc Type | Summary Info |
|---|---|---|
| Low | Webpage | Descriptor |
| Medium | Webpage | Main Title |
| High | Webpage | Main Title, Subtitle, Key Photo, Author |

Table 2 illustrates three example levels of detail that may be specified for a webpage. By customizing detail level 140, a first user may select or specify that the user only wants a low level of detail (corresponding to the descriptor 130) included in a summary 124 for any rich data 120 that is identified as being a website link. While a second user may indicate, by selecting the high level of detail that the user wants the main title, subtitle, key photo, and author information included in the summary 124. A third user may prefer the medium level of detail and request the main title be included.

In an embodiment, a user 104 may request "more information" about a specific rich data portion 120A that has been specified at a particular level. For example, if a user Julie has preferred the Low level for a webpage, then for example, during or after hearing the descriptor information for the webpage (as indicated by her preferred level), she may issue the voice command "more information" or "more detail". TES 102 may then either provide the next higher level of information available or the highest amount of information available for that webpage. If Julie is already at the highest level, then TES 102 may respond with summary 124 indicating that no more additional information is available, or by reading the full textual content of the rich data word-for-word.

In an embodiment, a user 104 may issue or speak a "skip" request to skip the remainder of an audible output of either the summary 124 being output, or the remainder of the audible document 122. Document reader 112 may then skip to and read the next section (if any) of audible document 122, or end the audible output. A "repeat" command received from user 104, may enable or cause document reader 112 to start over and read or audibly output the text from the beginning of the current or most recently read section (e.g., text 118 or summary 124) of audible document 122, or from the beginning of the audible document 122.

In an embodiment, TES 102 may track and update user profile 138 based on a usage history 144 of the user 104. For example, if a user requests "more information" for a particular type of document, such as a webpage, three times in a row, then TES 102 may automatically update the default detail level 140 for the particular type of document for the user 104. In another embodiment, TES 102 may prompt or request the user 104 if they want their profile updated based on the usage history 144.

In an embodiment, TES 102 may also enable users to request "less information." A less information command may cause TES 102 to move to a lower level of detail for output for the document 108. For example, if a user 104 has selected the Medium preference level (from Table 2), a less information command may cause TES 102 to stop audible output of the main title immediately, and audibly output the descriptor associated with the Low level. If on the Low level, a user 104 requests "less information" or a similar command, then TES 102 may indicate that there is no lower level of detail available. In an embodiment, if there are no more lower levels of detail available, TES 102 may skip or provide the user 104 with the option of skipping the corresponding rich data portion being audibly output. TES 102 may then continue audibly providing the remaining sections of audible document 122.

Figure 2:
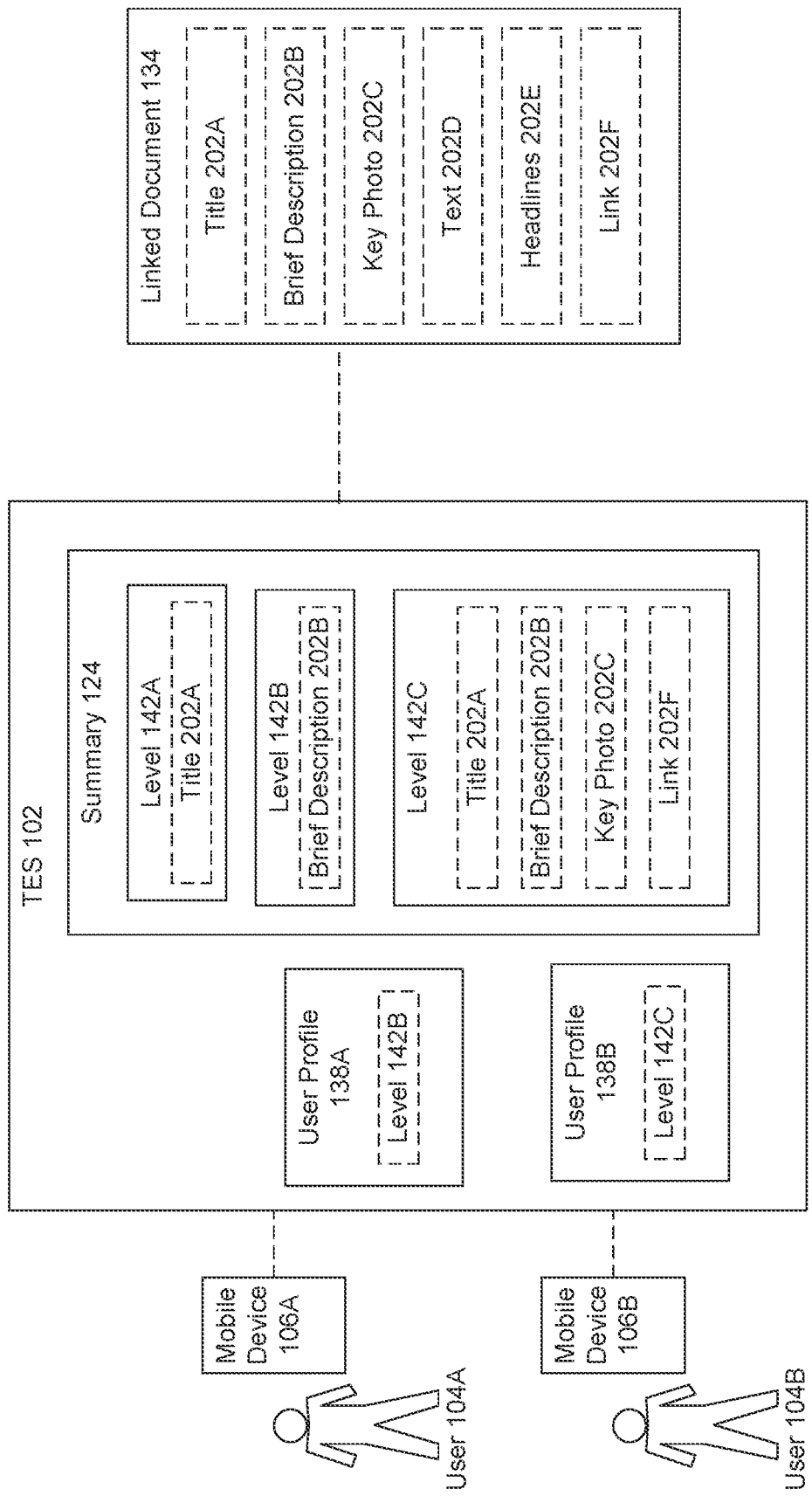
FIG. 2 is a block diagram illustrating another example of a text-to-speech enriching system (TES) architecture, according to some embodiments.

FIG. 2 is a block diagram 200 illustrating example functionality for providing a text-to-speech enriching system (TES) 102, according to some embodiments. In the example of FIG. 2, there are two users 104A, 104B each of whom have their own unique user profiles 138A, 138B. Both users 104A may request audible output for the same linked document 134. However, as indicated, each user profile 138 may have its own set of user preferences with regard to how much detail the user 104 wants output.

In an embodiment, TES 102 may generate different summaries 124 at different levels of detail 142A, 142B, 142C for the users 104A, 104B based on their profiles 138A, 138B. Then, when outputting the appropriate summary 124, TES 102 may provide to each mobile device 106, the summary 124 at the specified level of level 142 for that user 104.

In the example, shown, linked document portions 202A-202F may correspond to metadata 134B about linked document 134. The example metadata portions 202 may include a title 202A, brief description 202B, a key photo 202C which may include text describing the image, text 202D which may include unstructured, simple, or body text or content from the document 134, headlines or subheadings 202E, and links 202F to one or more attachments or other documents.

In the illustrated example, level 142A may include only title information 202A, while level 142B may include brief description information 202B. Level 142C however may include metadata 202A, 202B, 202C, and 202F. In an embodiment, a user 104 may request additional or more information beyond the specified preference level 142 as indicated in their user profile 138. Then, for example, TES 102 may provide the next greater detail level 142 of information that is available. In an embodiment, the levels 142 may be organized or tagged based on how much detail (least to most) is included. As such, if user 104A requests more information, level 142C may be provided.

If a user 104B requests more information, and there is no more detailed information beyond level 142C, TES 102 may ask the user if the user wants to receive an audible version of the full text of linked document 134. If the user responds yes, TES 102 may then perform a word-for-word reading of linked document 134, or process linked document 134 as an original document 108 (of FIG. 1) and provide a new audible version 122 of linked document 134 as described herein. In another embodiment, the full or original text of a document may be the default audible output, and the various levels of details 142A, 142B, and 142C may be opted in by one or more users.

Figure 3:
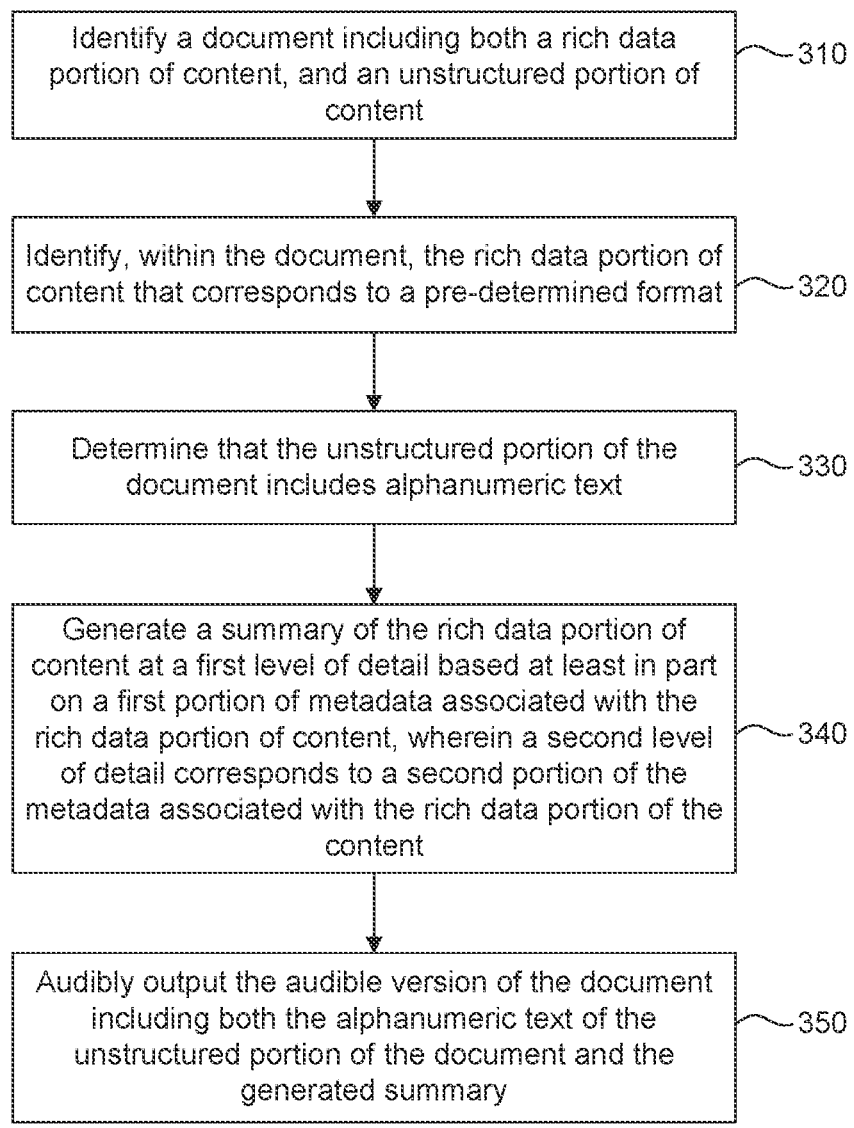
FIG. 3 is a flowchart illustrating example operations of a text-to-speech enriching system (TES), according to some embodiments.

FIG. 3 is a flowchart 300 illustrating example operations of a text-to-speech enriching system (TES) architecture, according to some embodiments. Method 300 can be performed by processing logic that can comprise hardware (e.g., circuitry, dedicated logic, programmable logic, microcode, etc.), software (e.g., instructions executing on a processing device), or a combination thereof. For example, various steps in method 300 may be performed using one or more application programming interfaces (APIs) operating on one or more processing devices. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to the example embodiments.

In 310, a document including text is identified, wherein the text includes both a structured portion of text, and an unstructured portion of text. For example, TES 102 may receive or retrieve document 108 from mobile device 106 or another webserver 136. Data profiler 114 may scan text 110 for any structured portions of text 110 that are classified, tagged, or otherwise identified as being rich data 120.

In 320, both the structured portion and unstructured portions of the text are identified within the document rich data, wherein the structured portion corresponds to a rich data portion that includes both a descriptor and content, and wherein an unstructured portion of the text includes alpha-numeric text. The type 116 may indicate a structure or format of known or previously defined rich data 120.

Example structures may include: a table or image within a word processing document, an image, audio, or other file attachment, a website address, a network address, an IP address, a phone number, and a zip code. For example, the structure of a website address may include the identification of the text "http://", "www", and/or any text followed by ".com". An image file attachment may include the structure of ending with a ".gif," ".jpg" or ".png" extension. A United States zip code may include a five numbers that fall within a specific range of known US zip codes. Phone numbers for different countries may each have their own structures and may be identified by data profiler.

In an embodiment, data profiler 114 may identify user, document, or implementation specific structures as well. For example, a particular company may always report sales numbers in an e-mail titled "Weekly Sales Report." Data profiler 114 may identify "Weekly Sales Report" as the title of an email (e.g., document 108) based on metadata of document 108, and thus may identify the document 108 as including rich data 120.

In an embodiment, rich data portion 120 may include a descriptor 130 and content 132. For example, with an image attachment, the descriptor may include a file name, and the content 132 may include the actual image and/or metadata about the image. Doc 108 may also alphanumeric text which may include any letters, numbers, and/or symbols that do not correspond to one of the predefined structures or types 116. In an embodiment, data profiler 114 may scan document 108 and identify a sequence or ordering of text only portions 118A, 118B and rich data portions 120A, 120B of document 108.

In 330, a summary of the content of the rich data portion of the document at a specified level of detail is generated. For example, RDA 126 may generate summaries 124A and 124B for the identified or classified rich data 120A and 120B. The summaries 124A may be specific to the user 104 requesting an audible output, and may vary based on the structure or type 116 of document or rich data 120. TES 102 may assemble an ordered audible document 122 to be output via a document reader 112.

In another embodiment, a user preferences or profile 138 may indicate that any rich data portions 120 are read, ordered, or arranged before any text-only portions 118A, 118B of document 108. TES 102 may then arrange summaries 124A, 124B prior to text 118A, 118B.

In 340, an audible version of the document including both the text-only portion of the document and the summary of the content of the rich data portion of the document is output. For example, TES 102 may provide audible document 122 to mobile device 106, which may be read via a speaker or other output mechanism by a document reader 112. Text 118 may correspond to any alpha-numeric text read or identified in document 108 that is transferred or copied to the audible document 122 without data enrichment.

Figure 4:
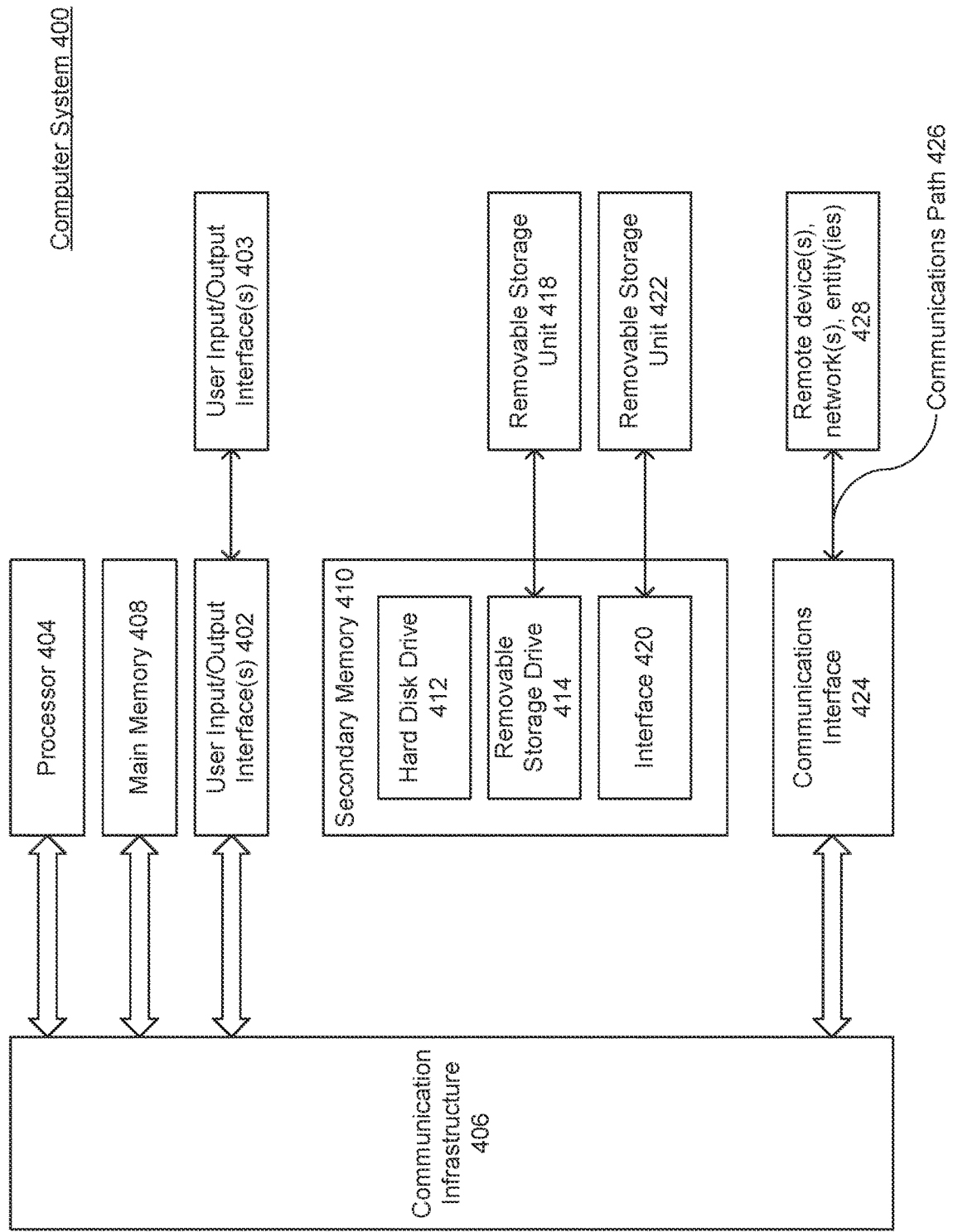
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Figure 5:
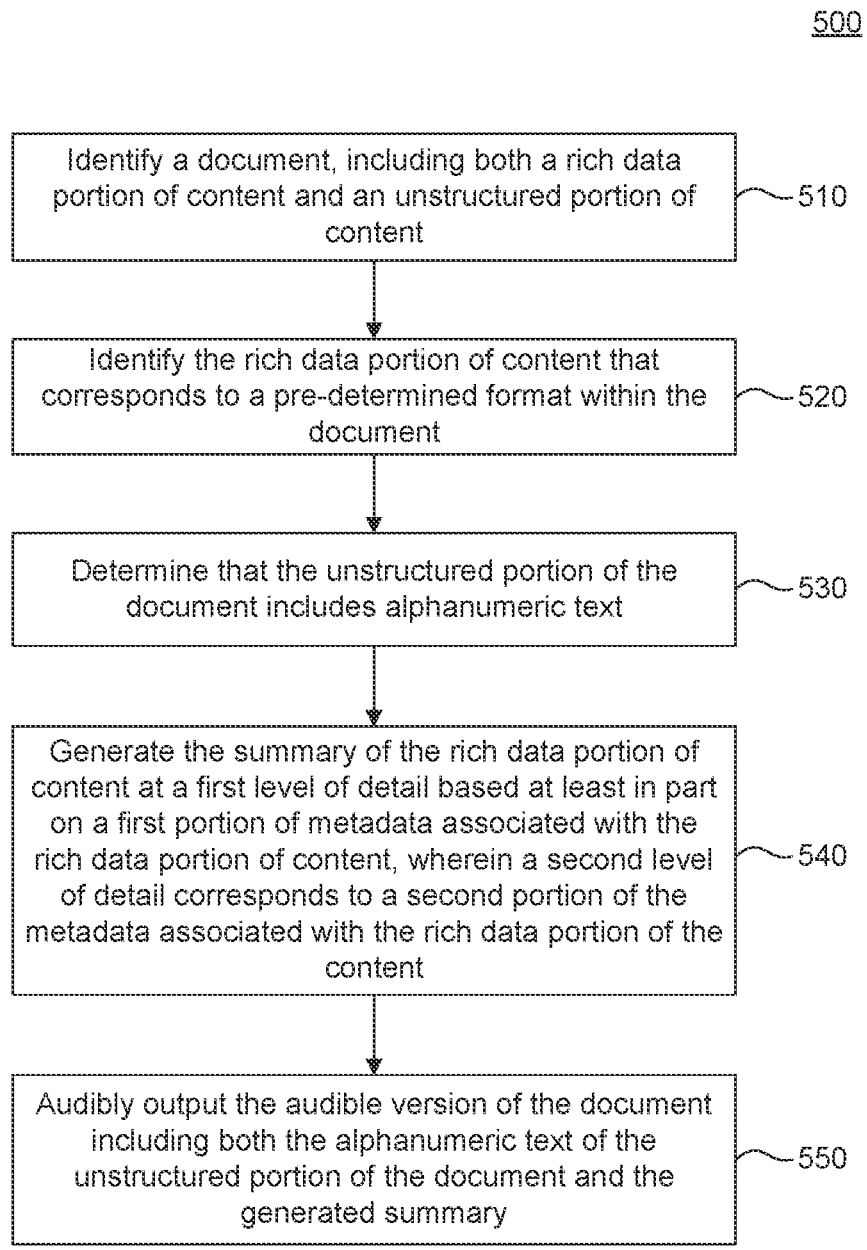
FIG. 5 is another flowchart illustrating example operations of a text-to-speech enriching system (TES) architecture, according to some embodiments.

FIG. 5 is another flowchart 500 illustrating example operations of a text-to-speech enriching system (TES) architecture, according to some embodiments. Method 500 can be performed by processing logic that can comprise hardware (e.g., circuitry, dedicated logic, programmable logic, microcode, etc.), software (e.g., instructions executing on a processing device), or a combination thereof. For example, various steps in method 500 may be performed using one or more application programming interfaces (APIs) operating on one or more processing devices. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1. However, method 500 is not limited to the example embodiments.

In 510, a document, including both a rich data portion of content and an unstructured portion of content, is identified. For example, TES 102 may receive or be provided an identity of a document 108, such as a word processing document, spreadsheet, webpage or email. The document 108 may include both a rich data portion 120A, and a an alphanumeric text portion 118.

In 520, the rich data portion of content that corresponds to a pre-determined format is identified within the document. For example, data profiler 114 may scan the alphanumeric text or multimedia of document 108 and identify any rich data portions 120A, 120B. In an embodiment, data profiler 114 may compare the alphanumeric text or multimedia against any one of more know pre-identified or pre-defined rich data formats or formulas (e.g., types 116). Some example types 116 include a chart, graph, image, IP address, telephone number, or social security number.

In 530, it is determined that the unstructured portion of the document includes alphanumeric text. For example, data profiler 114 may provide a general tag to portions of the document which are not classified as rich data 120A, 120B, as text portions 118. Any portions of document 108 marked or identified as text 118 may not be provided to a rich data annotator 126 for generating a summary 124.

In 540, the summary of the rich data portion of content is generated at a first level of detail based at least in part on a first portion of metadata associated with the rich data portion of content, wherein a second level of detail corresponds to a second portion of the metadata associated with the rich data portion of the content. For example, a user profile 138 for a requesting user 104, may indicate a detail level 140 for which RDA 126 generates a summary 124 for one or more rich data 120A, 120B portions of document 108. The detail level 140 may correspond to which information or metadata or a particular process used to generate summary 124, and each detail level 140 may use different information, different metadata, or a different summary generation process.

In 550, the audible version of the document including both the alphanumeric text of the unstructured portion of the document and the generated summary are audibly output. For example, TES 102 may provide the audible document 122 back to mobile device 106, which then uses document reader 112 to audibly output or verbalize the text 118 and summaries 124A, 124B of audible document 122 through a speaker or headset for user 104.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for producing an audible version of a document comprising:
    receiving text to be converted into audible output;
    identifying a webpage address within the text;
    retrieving a webpage corresponding to the webpage address, wherein the retrieved webpage is not displayed on a user interface;
    identifying metadata from the retrieved webpage corresponding to the webpage address, the metadata identifying various portions of content of the webpage;
    selecting a portion of the metadata to replace the webpage address in an audible version of the text;
    replacing, by a computing device, the webpage address with the selected portion of metadata of the retrieved webpage corresponding to the webpage address in the audible version of the text; and
    providing the audible version of the text including the selected portion of metadata for audible output.

2. The computer-implemented method of claim 1, wherein the text is received from a text message.

3. The computer-implemented method of claim 1, wherein the text is received from an email.

4. The computer-implemented method of claim 1, wherein the identifying comprises:
    identifying the webpage address based on a prefix of the webpage address.

5. The computer-implemented method of claim 1, wherein the identifying comprises:
    identifying the webpage address based on a suffix of the webpage address.

6. The computer-implemented method of claim 1, wherein the webpage comprises an image, and the selected portion of metadata comprises a file name of the image.

7. The computer-implemented method of claim 1, wherein the metadata of the retrieved webpage comprises one or more of: a main title, a subtitle, a headline, a description, an author, and a date published.

8. The computer-implemented method of claim 1, wherein the replacing comprises:
    including a webpage designation prior to the selected portion of metadata in the audible version of the text.

9. A system comprising:
    a memory; and
    at least one processor coupled to the memory and configured to perform operations comprising:
        receiving text to be converted into audible output;
        identifying a webpage address within the text;
        retrieving a webpage corresponding to the webpage address, wherein the retrieved webpage is not displayed on a user interface;
        identifying metadata from the retrieved webpage corresponding to the webpage address, the metadata identifying various portions of content of the webpage;
        selecting a portion of the metadata to replace the webpage address in an audible version of the text;
        replacing the webpage address with the selected portion of metadata of the retrieved webpage corresponding to the webpage address in the audible version of the text; and
        providing the audible version of the text including the selected portion of metadata for audible output.

10. The system of claim 9, wherein the text is received from a text message.

11. The system of claim 9, wherein the text is received from an email.

12. The system of claim 9, wherein the identifying comprises:
    identifying the webpage address based on a prefix of the webpage address.

13. The system of claim 9, wherein the identifying comprises:
    identifying the webpage address based on a suffix of the webpage address.

14. The system of claim 9, wherein the webpage comprises an image, and the selected portion of metadata comprises a file name of the image.

15. The system of claim 9, wherein the metadata of the retrieved webpage comprises one or more of: a main title, a subtitle, a headline, a description, an author, and a date published.

16. The system of claim 9, wherein the replacing comprises:
    including a webpage designation prior to the selected portion of metadata in the audible version of the text.

17. A non-transitory computer-readable medium having instructions stored thereon that, when executed by one or more processors, cause the one or more processors to perform operations comprising:

receiving text to be converted into audible output;
identifying a webpage address within the text;
retrieving a webpage corresponding to the webpage address, wherein the retrieved webpage is not displayed on a user interface;
identifying metadata from the retrieved webpage corresponding to the webpage address, the metadata identifying various portions of content of the webpage;
selecting a portion of the metadata to replace the webpage address in an audible version of the text;
replacing the webpage address with the selected portion of metadata of the retrieved webpage corresponding to the webpage address in the audible version of the text; and
providing the audible version of the text including the selected portion of metadata for audible output.

18. The non-transitory computer-readable medium of claim 17, wherein the text is received from one of a text message or an email.

19. The non-transitory computer-readable medium of claim 17, wherein the identifying comprises:
identifying the webpage address based on a prefix of the webpage address.

20. The non-transitory computer-readable medium of claim 17, wherein the identifying comprises:
identifying the webpage address based on a suffix of the webpage address.

* * * * *